United States Patent
Chang et al.

(10) Patent No.: US 9,008,472 B2
(45) Date of Patent: Apr. 14, 2015

(54) LIGHT GUIDE PLATE AND MANUFACTURING METHOD THEREOF

(75) Inventors: Kuangyao Chang, Shenzhen (CN); Chong Xiong, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 246 days.

(21) Appl. No.: 13/699,630

(22) PCT Filed: Sep. 13, 2012

(86) PCT No.: PCT/CN2012/081313
§ 371 (c)(1),
(2), (4) Date: Nov. 22, 2012

(87) PCT Pub. No.: WO2014/029145
PCT Pub. Date: Feb. 27, 2014

(65) Prior Publication Data
US 2014/0056555 A1 Feb. 27, 2014

(51) Int. Cl.
*G02B 6/26* (2006.01)
*F21V 8/00* (2006.01)

(52) U.S. Cl.
CPC ............ *G02B 6/0043* (2013.01); *G02B 6/0081* (2013.01)

(58) Field of Classification Search
None
See application file for complete search history.

(56) References Cited

U.S. PATENT DOCUMENTS

2006/0068329 A1* 3/2006 Aylward et al. ............... 430/311
2006/0204718 A1* 9/2006 Kawakami .................... 428/141

FOREIGN PATENT DOCUMENTS

| CN | 2606904 Y | 3/2004 |
| CN | 1550529 A | 12/2004 |
| CN | 101042451 A | 9/2007 |
| CN | 101042488 A | 9/2007 |
| CN | 101630028 A | 1/2010 |
| WO | WO2009029438 A1 | 3/2009 |

* cited by examiner

*Primary Examiner* — Sung Pak
(74) *Attorney, Agent, or Firm* — Andrew C. Cheng

(57) ABSTRACT

The present invention provides a light guide plate and a manufacturing method thereof. The light guide plate includes a light guide plate body and ink dots printed on a surface of the light guide plate body. The ink dots contain an antistatic agent. The manufacturing method of the light guide plate includes (1) providing a light guide plate body; (2) providing an ink and an antistatic agent ad mixing the antistatic agent in the ink; and (3) printing the ink that contains the antistatic agent on a surface of the light guide plate body to form the ink dots. The antistatic agent contained in the ink dots helps suppressing static electricity generated on the light guide plate so as to eliminate mura caused by electrostatic attraction.

12 Claims, 5 Drawing Sheets

LIGHT GUIDE PLATE AND MANUFACTURING METHOD THEREOF

BACKGROUND OF THE INVENTION

1. Field of the Invention

The present invention relates to the field of liquid crystal displaying, and in particular to a novel light guide plate for backlight module and a manufacturing method thereof.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light emergence face of the light guide plate, after being reflected and diffused, to thereby transmit through an optic film assembly and form a planar light source for the liquid crystal panel.

In a side-edge backlight module, the light guide plate is a necessary component. The light guide plate is often made of polymethylmethacrylate (PMMA) or polyacrylate organic-inorganic nano-composite material (MS material). The light guide plate has a bottom surface on which ink dots are formed to destruct total reflection of light in order to allow light to be projected out of the light emergence face of the light guide plate. As shown in FIG. 1, the commonly used ink dots 120 are formed by applying printing techniques to print ink on a surface of a body 100 of the light guide plate.

Since the light guide plate are in contact with a reflector plate and optic films within the backlight module and since the light guide plate has a relatively high resistance of which the volume resistivity is 10-15 Ohm·cm. Thus, the light guide plate can easily induce static electricity. As shown in FIG. 2, due to electrostatic attraction, mura (speckles, which are various marking and trace caused by non-uniform brightness of display) when the liquid crystal panel is displaying an image.

SUMMARY OF THE INVENTION

An object of the present invention is to provide a light guide plate, which suppresses the generation of static electricity on the light guide plate by adding an antistatic agent in ink dots printed on a surface of the light guide plate so as to eliminate the mura issue caused by electrostatic attraction.

To achieve the above object, the present invention provides a light guide plate, which comprises a light guide plate body and ink dots printed on a surface of the light guide plate body. The ink dots comprises an antistatic agent.

The antistatic agent comprises a cationic antistatic agent, an anionic antistatic agent, an amphoteric antistatic agent, or a non-ionic antistatic agent.

The cationic antistatic agent comprises quaternary ammonium salts, fatty amine, or amine salts and derivatives thereof; the anionic antistatic agent comprises sulfate and salts thereof, phosphate and phosphate salts, or alkyl salicylate; the amphoteric antistatic agent comprises quaternary ammonium inner salts, amphoteric alkyl imidazolium salts, or alkyl amino acids; and the non-ionic antistatic agent comprises polyalcohol, polyalcohol ester, ethylene oxide adduct of alcohol or aminophenol, or ethylene oxide adduct of amine or amide.

The cationic antistatic agent is a quaternary ammonium salts; the anionic antistatic agent is sulfate; the amphoteric antistatic agent is a quaternary ammonium inner salt; and the non-ionic antistatic agent is polyalcohol.

The present invention also provides a method for manufacturing a light guide plate, which comprises the following steps:

Step 1: providing light guide plate body;

Step 2: providing an ink and an antistatic agent and mixing the antistatic agent in the ink; and Step 3: printing the ink that contains the antistatic agent on a surface of the light guide plate body to form ink dots.

The antistatic agent comprises a cationic antistatic agent, an anionic antistatic agent, an amphoteric antistatic agent, or a non-ionic antistatic agent.

The cationic antistatic agent comprises quaternary ammonium salts, fatty amine, or amine salts and derivatives thereof; the anionic antistatic agent comprises sulfate and salts thereof, phosphate and phosphate salts, or alkyl salicylate; the amphoteric antistatic agent comprises quaternary ammonium inner salts, amphoteric alkyl imidazolium salts, or alkyl amino acids; and the non-ionic antistatic agent comprises polyalcohol, polyalcohol ester, ethylene oxide adduct of alcohol or aminophenol, or ethylene oxide adduct of amine or amide.

The present invention further provide a method for manufacturing a light guide plate, which comprises the following steps:

Step 11: providing a light guide plate body;

Step 12: providing an ink and printing the ink on a surface of the light guide plate body to form ink dots; and Step 13: providing an antistatic agent and printing the antistatic agent on surfaces of the ink dots.

The antistatic agent comprises a cationic antistatic agent, an anionic antistatic agent, an amphoteric antistatic agent, or a non-ionic antistatic agent.

The cationic antistatic agent comprises quaternary ammonium salts, fatty amine, or amine salts and derivatives thereof; the anionic antistatic agent comprises sulfate and salts thereof, phosphate and phosphate salts, or alkyl salicylate; the amphoteric antistatic agent comprises quaternary ammonium inner salts, amphoteric alkyl imidazolium salts, or alkyl amino acids; and the non-ionic antistatic agent comprises polyalcohol, polyalcohol ester, ethylene oxide adduct of alcohol or aminophenol, or ethylene oxide adduct of amine or amide.

The efficacy of the present invention is that the present invention provides a light guide plate, which suppresses and eliminates static electricity generated on the light guide plate by adding an antistatic agent to ink dots printed on a surface of the light guide plate body so as to avoid the issue of mura caused by electrostatic attraction. The light guide plate can be manufactured with a simple manufacturing process and is easy to realize with low cost and high manufacturing performance and can effectively overcome the mura issue caused by static electricity generated on the light guide plate.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
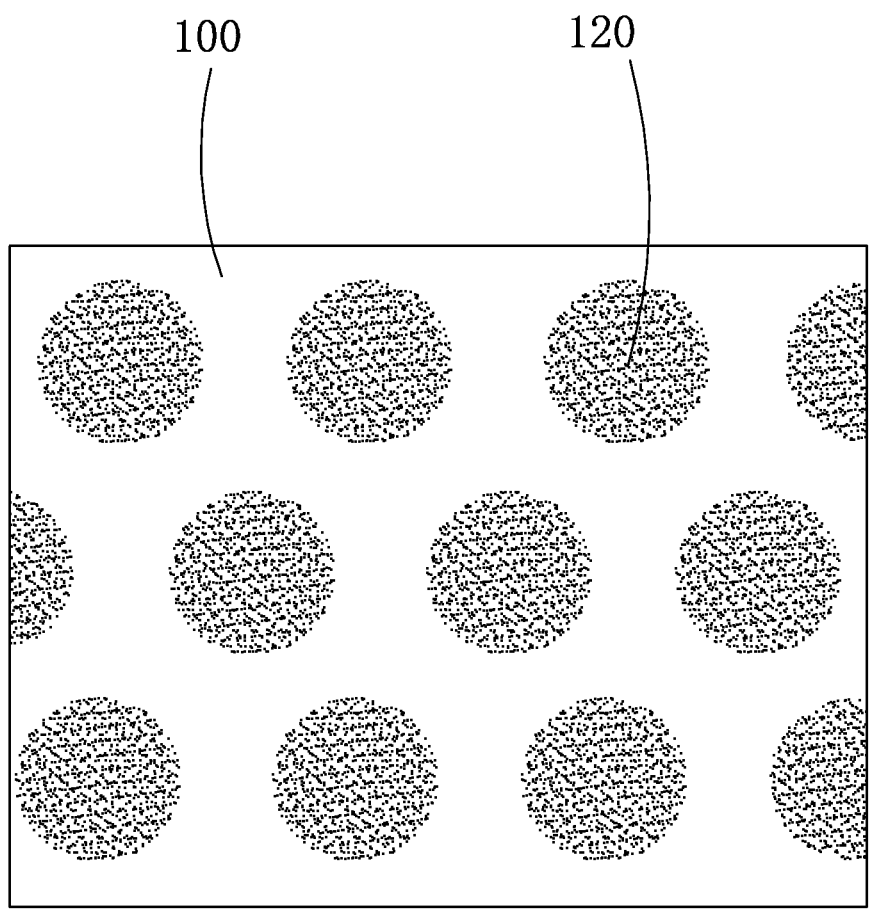
FIG. 1 shows ink dots formed on a conventional light guide plate.
Figure 2:
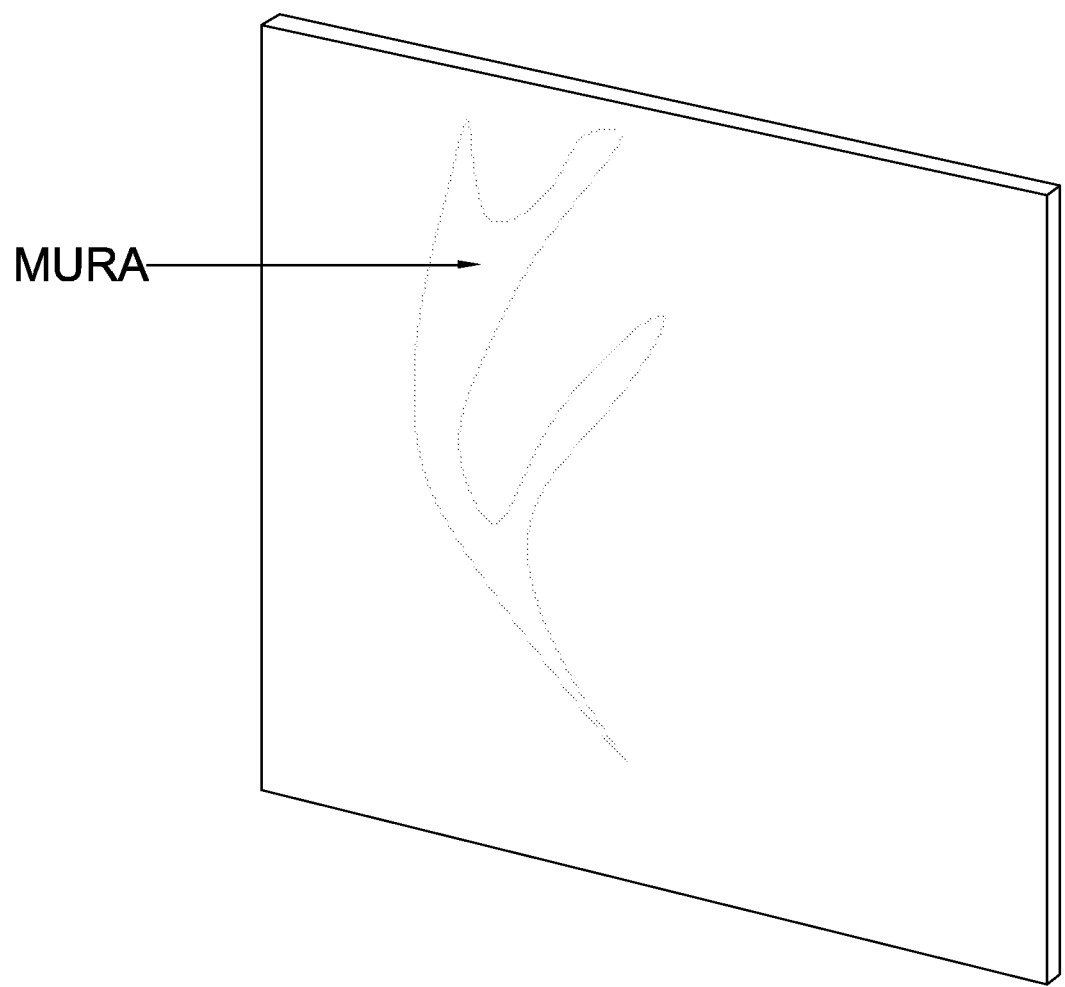
FIG. 2 shows mura caused by static electricity induced on a conventional light guide plate.
Figure 3:
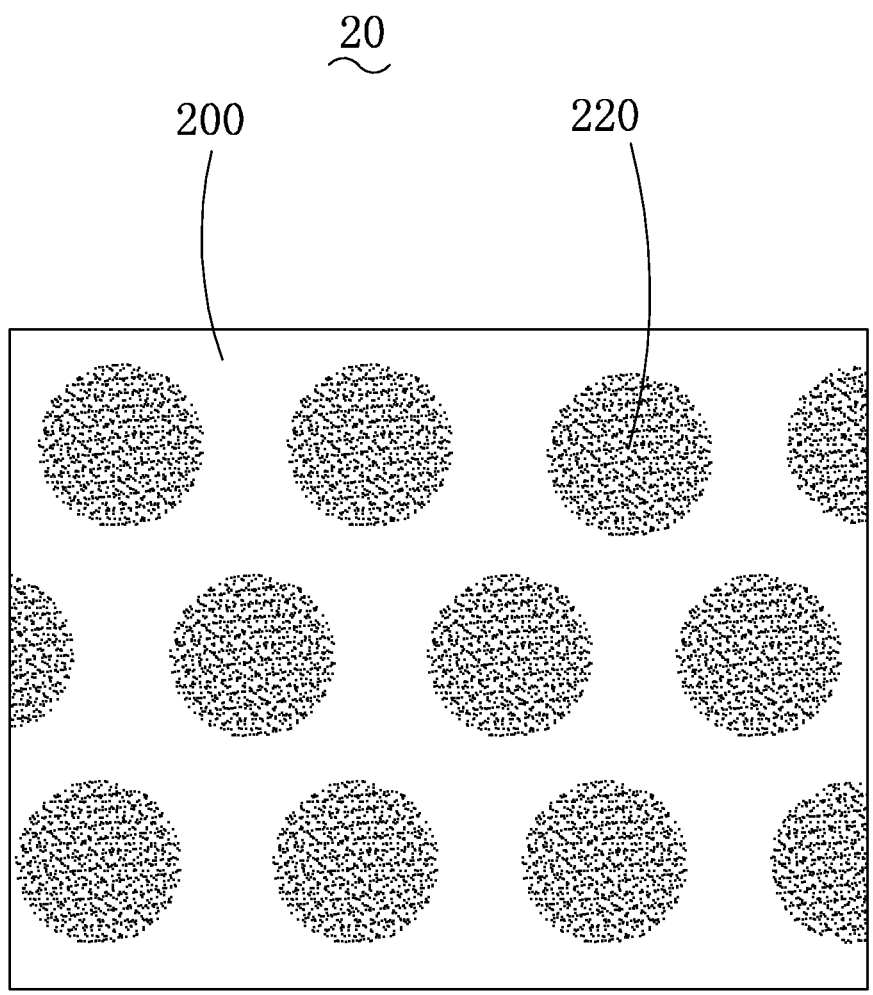
FIG. 3 shows a light guide plate according to the present invention.

Referring to FIG. 3, the present invention provides a light guide plate 20, which comprises a light guide plate body 200 and ink dots 220 printed on the light guide plate body. The ink dots contain therein an antistatic agent.

The light guide plate 20 is made of polymethylmethacrylate (PMMA) or a polyacrylate organic-inorganic nano-composite material (MS material), showing a relatively high resistivity and easily inducing static electricity. The ink dots 220 formed on the light guide plate 20 function to destruct total refection of light so as to allow the light to project out through a light emergence surface of the light guide plate 20. In case that the ink dots 220 to not contain any antistatic agent, static electricity accumulates when the light guide plate 20 is set in contact with a reflector plate and an optic film and electrostatic attraction is generated, leading to mura. If an antistatic agent is added to the ink dots 220, the antistatic agent effectively suppresses and eliminates the generation of static electricity on the light guide plate 20 so as to prevent the occurrence of mura.

The antistatic agent can be a cationic antistatic agent, an anionic antistatic agent, an amphoteric antistatic agent, or a non-ionic antistatic agent.

The cationic antistatic agent used can be quaternary ammonium salts, fatty amine, or amine salts and derivatives thereof and is preferably quaternary ammonium salts. The anionic antistatic agent can be sulfate and salts thereof, phosphate and phosphate salts, or alkyl salicylate and is preferably sulfate. The amphoteric antistatic agent can be quaternary ammonium inner salts, amphoteric alkyl imidazolium salts, or alkyl amino acids and is preferably quaternary ammonium inner salts. The non-ionic antistatic agent can be polyalcohol, polyalcohol ester, ethylene oxide adducts of alcohol or aminophenol, or ethylene oxide adducts of amine or amide and is preferably polyalcohol.

Figure 4:
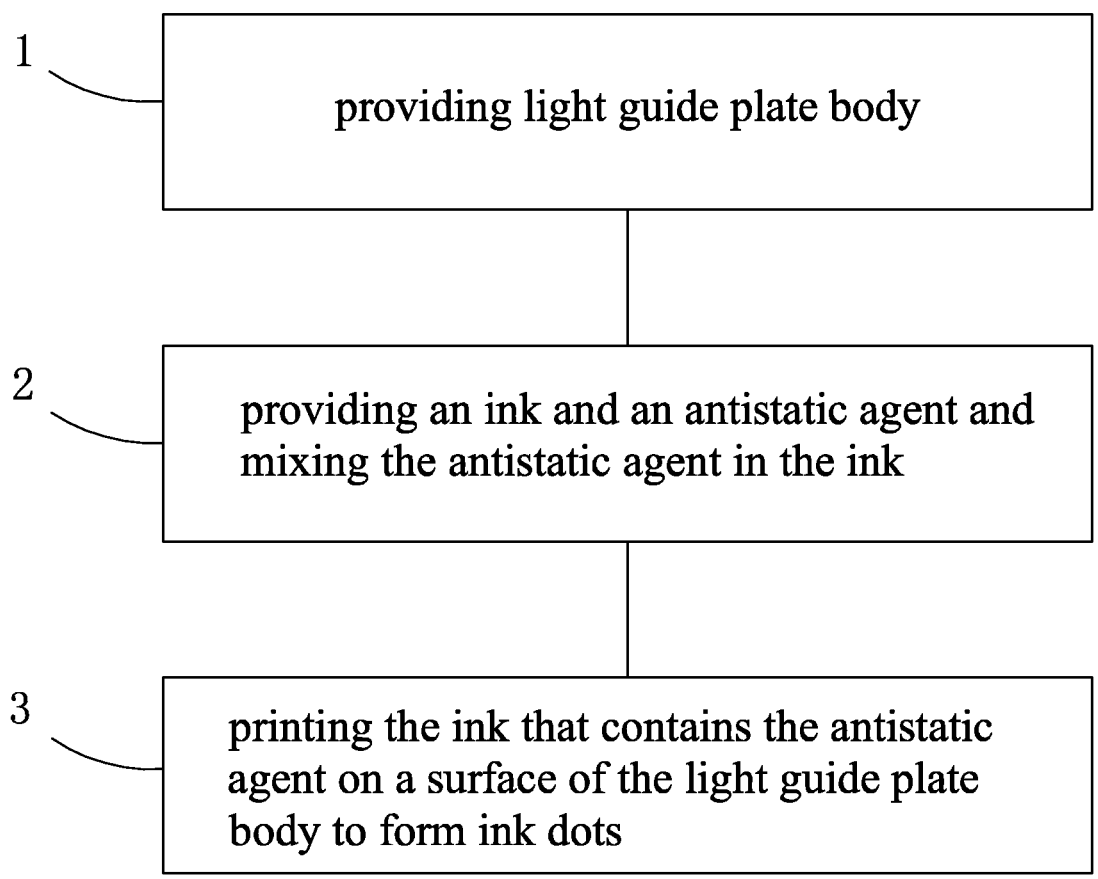
FIG. 4 is a flow chart illustrating a manufacturing method of light guide plate according to an embodiment of the present invention.

Referring to FIG. 4, the light guide plate according to the embodiment of the present invention can be manufactured with a method comprising the following steps:

Step 1: providing a light guide plate body.

Step 2: providing an ink and an antistatic agent and mixing the antistatic agent in the ink.

The antistatic agent can be a cationic antistatic agent, an anionic antistatic agent, an amphoteric antistatic agent, or a non-ionic antistatic agent.

The cationic antistatic agent used can be quaternary ammonium salts, fatty amine, or amine salts and derivatives thereof and is preferably quaternary ammonium salts. The anionic antistatic agent can be sulfate and salts thereof, phosphate and phosphate salts, or alkyl salicylate and is preferably sulfate. The amphoteric antistatic agent can be quaternary ammonium inner salts, amphoteric alkyl imidazolium salts, or alkyl amino acids and is preferably quaternary ammonium inner salts. The non-ionic antistatic agent can be polyalcohol, polyalcohol ester, ethylene oxide adducts of alcohol or aminophenol, or ethylene oxide adducts of amine or amide and is preferably polyalcohol.

Step 3: printing the ink that contains the antistatic agent on a surface of the light guide plate body to form ink dots.

Figure 5:
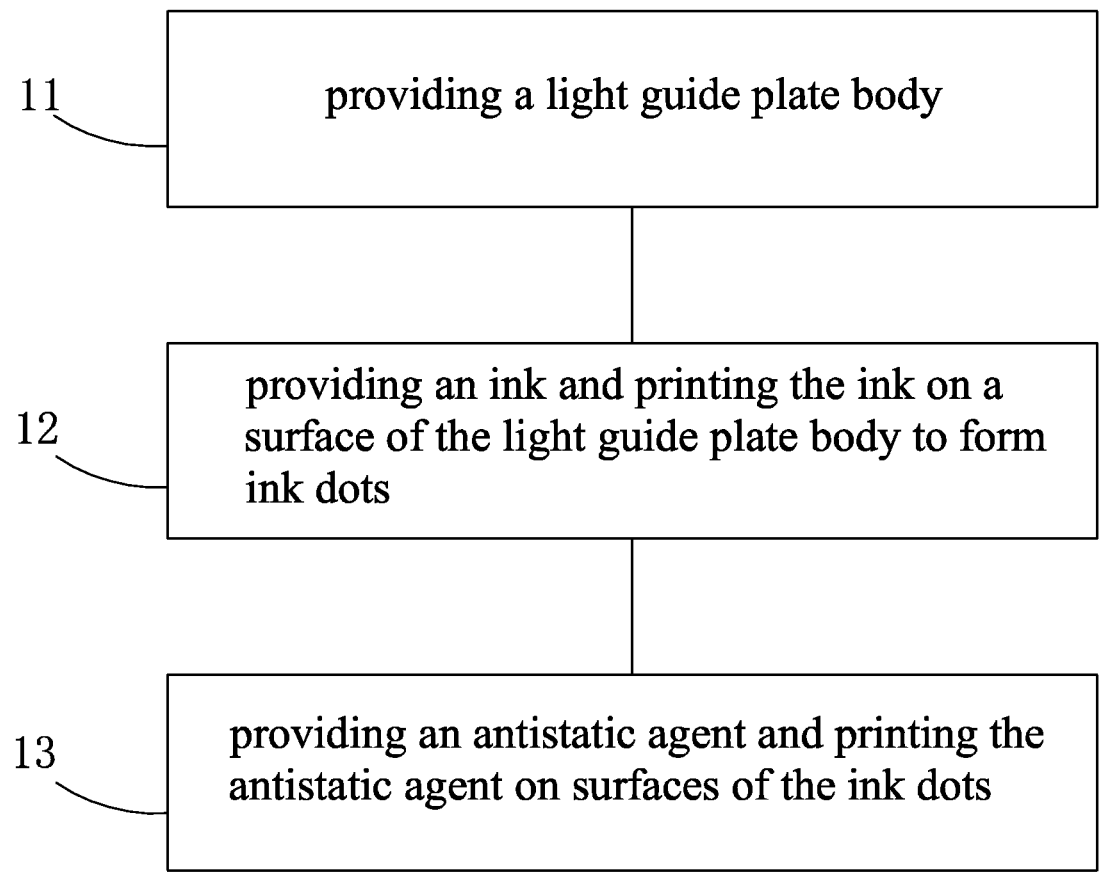
FIG. 5 is a flow chart illustrating a manufacturing method of light guide plate according to another embodiment of the present invention.

Referring to FIG. 5, a flow chart illustrating a method for manufacturing the light guide plate of the present invention according to another embodiment is given and comprises the following steps:

Step 11: providing a light guide plate body;

Step 12: providing an ink and printing the ink on a surface of the light guide plate body to form ink dots; and Step 13: providing an antistatic agent and printing the antistatic agent on surfaces of the ink dots.

The antistatic agent can be a cationic antistatic agent, an anionic antistatic agent, an amphoteric antistatic agent, or a non-ionic antistatic agent.

The cationic antistatic agent used can be quaternary ammonium salts, fatty amine, or amine salts and derivatives thereof and is preferably quaternary ammonium salts. The anionic antistatic agent can be sulfate and salts thereof, phosphate and phosphate salts, or alkyl salicylate and is preferably sulfate. The amphoteric antistatic agent can be quaternary ammonium inner salts, amphoteric alkyl imidazolium salts, or alkyl amino acids and is preferably quaternary ammonium inner salts. The non-ionic antistatic agent can be polyalcohol, polyalcohol ester, ethylene oxide adducts of alcohol or aminophenol, or ethylene oxide adducts of amine or amide and is preferably polyalcohol.

In summary, the present invention provides a light guide plate, which suppresses and eliminates static electricity generated on the light guide plate by adding an antistatic agent to ink dots printed on a surface of the light guide plate body so as to avoid the issue of mura caused by electrostatic attraction. The light guide plate can be manufactured with a simple manufacturing process and is easy to realize with low cost and high manufacturing performance and can effectively overcome the mura issue caused by static electricity generated on the light guide plate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light guide plate adapted for a side-edge backlight module which is for forming a planar light source to provide lighting to a liquid crystal panel, the light guide plate comprising a light guide plate body and ink dots printed on a surface of the light guide plate body, the ink dots comprising an antistatic agent;

wherein the light guide plate body further comprises a light incident surface for receiving light emitted from a light source and a light emergence surface, the ink dots are configured for destructing a total reflection of light to thereby allow the light to be projected out for lighting the liquid crystal panel through the light emergence surface of the light guide plate body.

2. The light guide plate as claimed in claim 1, wherein the antistatic agent comprises a cationic antistatic agent, an anionic antistatic agent, an amphoteric antistatic agent, or a non-ionic antistatic agent.

3. The light guide plate as claimed in claim 2, wherein the cationic antistatic agent comprises quaternary ammonium salts, fatty amine, or amine salts and derivatives thereof; the anionic antistatic agent comprises sulfate and salts thereof, phosphate and phosphate salts, or alkyl salicylate; the amphoteric antistatic agent comprises quaternary ammonium inner salts, amphoteric alkyl imidazolium salts, or alkyl amino acids; and the non-ionic antistatic agent comprises polyalcohol, polyalcohol ester, ethylene oxide adduct of alcohol or aminophenol, or ethylene oxide adduct of amine or amide.

4. The light guide plate as claimed in claim 3, wherein the cationic antistatic agent is a quaternary ammonium salts; the anionic antistatic agent is sulfate; the amphoteric antistatic agent is a quaternary ammonium inner salt; and the non-ionic antistatic agent is polyalcohol.

5. A method for manufacturing the light guide plate according to claim 1, comprising the following steps:
(1) providing light guide plate body;
(2) providing an ink and an antistatic agent and mixing the antistatic agent in the ink; and
(3) printing the ink that contains the antistatic agent on a surface of the light guide plate body to form ink dots.

6. The method for manufacturing the light guide plate according to claim 5, wherein the antistatic agent comprises a cationic antistatic agent, an anionic antistatic agent, an amphoteric antistatic agent, or a non-ionic antistatic agent.

7. The method for manufacturing the light guide plate according to claim 6, wherein the cationic antistatic agent comprises quaternary ammonium salts, fatty amine, or amine salts and derivatives thereof; the anionic antistatic agent comprises sulfate and salts thereof, phosphate and phosphate salts, or alkyl salicylate; the amphoteric antistatic agent comprises quaternary ammonium inner salts, amphoteric alkyl imidazolium salts, or alkyl amino acids; and the non-ionic antistatic agent comprises polyalcohol, polyalcohol ester, ethylene oxide adduct of alcohol or aminophenol, or ethylene oxide adduct of amine or amide.

8. A method for manufacturing the light guide plate according to claim 1, comprising the following steps:
(A) providing a light guide plate body;
(B) providing an ink and printing the ink on a surface of the light guide plate body to form ink dots; and
(C) providing an antistatic agent and printing the antistatic agent on surfaces of the ink dots.

9. The method for manufacturing the light guide plate according to claim 8, wherein the antistatic agent comprises a cationic antistatic agent, an anionic antistatic agent, an amphoteric antistatic agent, or a non-ionic antistatic agent.

10. The method for manufacturing the light guide plate according to claim 9, wherein the cationic antistatic agent comprises quaternary ammonium salts, fatty amine, or amine salts and derivatives thereof; the anionic antistatic agent comprises sulfate and salts thereof, phosphate and phosphate salts, or alkyl salicylate; the amphoteric antistatic agent comprises quaternary ammonium inner salts, amphoteric alkyl imidazolium salts, or alkyl amino acids; and the non-ionic antistatic agent comprises polyalcohol, polyalcohol ester, ethylene oxide adduct of alcohol or aminophenol, or ethylene oxide adduct of amine or amide.

11. The light guide plate as claimed in claim 1, wherein the light guide plate body is disposed in contact with a reflector plate and an optic film within the side-edge backlight module, and the antistatic agent is configured to suppress even eliminate the generation of static electricity on the light guide plate body.

12. The light guide plate as claimed in claim 1, wherein the surface of the light guide plate body on which the ink dots printed is a bottom surface of the light guide plate body.

* * * * *